United States Patent
Teramachi (10) Patent No.: US 6,419,069 B1
(45) Date of Patent: Jul. 16, 2002

(54) CROSS ROLLER ASSEMBLY AND CROSS ROLLER GUIDING APPARATUS USING THE SAME

(75) Inventor: Hiroshi Teramachi, 3-12-30-301, Kamiosaki, Shinagawa-ku, Tokyo (JP)

(73) Assignee: Hiroshi Teramachi, Tokyo (JP)

( * ) Notice: Subject to any disclaimer, the term of this patent is extended or adjusted under 35 U.S.C. 154(b) by 0 days.

(21) Appl. No.: 09/502,691

(22) Filed: Feb. 11, 2000

(51) Int. Cl.$^7$ ................................................ B65G 13/00

(52) U.S. Cl. .................... 193/35 R; 384/44; 384/51; 384/47; 384/447

(58) Field of Search .............................. 384/44, 45, 51, 384/47, 447, 617; 193/35 R, 37, 35 F, 35 MD; 198/841, 838

(56) References Cited

U.S. PATENT DOCUMENTS 4,687,345 A * 8/1987 Geka ............................ 384/44

* cited by examiner

Primary Examiner—Christopher P. Ellis
Assistant Examiner—Richard Ridley
(74) Attorney, Agent, or Firm—Brinks Hofer Gilson & Lione (57) ABSTRACT

A cross roller assembly suitable for use with rollers disposed in a cross roller arrangement is provided for the purpose of preventing the rollers from skewing as much as possible to thereby guide them in a stable manner. The cross roller assembly (21) includes first and second rollers (8, 9), and a retainer (22) for holding the first and second rollers (8, 9) in respective alignment with their axes of rotation alternatively arranged at right angles with respect to each other. The retainer (22) has a pair of end holders (23) for supporting the opposite ends of each roller. Each of the end holders (23) has an outer surface which is formed of a flat guide surface so as to regulate or restrict each roller to its suitable posture.

19 Claims, 6 Drawing Sheets

CROSS ROLLER ASSEMBLY AND CROSS ROLLER GUIDING APPARATUS USING THE SAME

BACKGROUND OF THE INVENTION

1. Field of the Invention

The present invention relates to a cross roller guide such as a linear-motion guiding apparatus, a swivel cross bearing, etc., using cross rollers arranged at right angles with respect to each other, and particularly to a cross roller connector or assembly having cross rollers serially connected with each other.

2. Description of the Related Art

A conventional cross roller guiding apparatus of this type is constructed such that it has a train of first rollers and a train of second rollers disposed in a pair of roller traveling grooves or track grooves of a V-shaped cross section respectively formed on mutually opposing surfaces of two relatively moving members with the axes of rotation of the first and second rollers being alternatively arranged at an angle of 90 degrees different from each other so as to guide relative movements of the two members through the first and second rollers. Such a roller arrangement is known as a so-called cross roller structure, which can receive, with the single row of rollers, loads acting thereon in every direction, e.g., in downward, upward, rightward and leftward directions, so that it is applicable to a variety of apparatuses which are subject to varying loads from all directions including fore and aft directions, right and left directions, etc.

In the case of a cross roller bearing, however, the axes of rotation of the first and second rollers are alternatively arranged or inclined at an angle of 90 degrees relative to each other, so it is difficult to always maintain the axes of rotation in their correct or desired postures with respect to the direction in which the rollers travel. When there takes place a skew in a roller, a half portion of the skewed roller is subject to a so-called edge load (i.e., an edge of the skewed roller is locally loaded), thereby damaging the roller and its associated roller rolling surfaces of a roller travelling path and hence degrading the durability thereof.

Moreover, the occurrence of such damage results in generation of vibrations and/or changes in the rolling resistance during rolling or travelling movement of the rollers on the roller rolling surfaces, and hence precludes smooth travel of the rollers from this point of view.

In order to prevent such a roller skew, there has conventionally been used a roller connector or assembly having a retainer for holding the first and second rollers in their predetermined postures, but such a conventional roller assembly is not at all satisfactory.

SUMMARY OF THE INVENTION

The present invention is intended to solve the problems of the prior art described above, and has for its object to provide a cross roller assembly which is suitable for use with rollers of a cross roller arrangement and which is capable of preventing rollers from being skewed as much as possible so as to guide the rollers in a stable manner.

In order to achieve the above object, according to one aspect of the present invention, there is provided a roller assembly comprising: a train of first rollers and a train of second rollers; and a retainer for holding the first and second rollers with their axes of rotation alternatively arranged at right angles with respect to each other, the retainer comprising a plurality of pairs of end holders for supporting opposite ends of the first and second rollers, each of the end holders having an outer surface formed of a flat guide surface. Thus, the first and second rollers are regulated or restricted in their postures so that they can roll and travel in a smooth manner.

The first and second rollers roll or slide while being regulated in their postures, whereas the retainer moves while being guided by the rollers. Thus, the first and second rollers and the retainer function to regulate or restrict their postures with each other to thereby facilitate mutual smooth movements. As a result, swaying or shaking of the rollers and the retainer, which are conventionally deemed as causes for roller skewing, can be effectively regulated or restricted with each other so as to permit smooth operation of the roller assembly.

Preferably, each of the retainers further comprises: a side holder for connecting roller-aligning direction opposite ends of each end holder with each other to thereby hold a side surface of each roller; and a connector member for connecting roller- non-holding side surfaces of each side holder with each other.

Preferably, engaging means may be provided between the opposite faces of each of the first and second rollers and the end holders for supporting each roller through the end holders while permitting rotation of the rollers relative to the end holders.

Preferably, a recess is formed in an inner surface of each end holder for loosely receiving or engaging an end of an associated roller so as to permit rotation of each roller relative to the associated end holder.

The above arrangements serve to increase the effect of preventing skewing of the rollers. In particular, when the rollers are passing semicircular turning passages of a circulation path, the roller can keep the same postures and positions thereof relative to the retainer as when they are passing the other portions of the circulation path, so that roller skewing can be positively precluded to suppress an increase in the contact bearing pressure against part of the roller retainer, thus making it possible for the cross roller assembly to circulate smoothly.

Moreover, the engaging means or loose fitting engagement between the rollers and the end holders also has a function of preventing the rollers from falling off from the retainer. Accordingly, maintenance operation for the cross roller assembly becomes easy and facilitated.

In addition, in the case of the cross roller assembly of the invention, a lubricant circulates while being retained in portions (so-called grease pockets) formed between the side holders of the retainer and the rollers adjoining each other via the side holders. This serves not only to prevent mutual friction between the rollers but also to enhance a retention capacity for the lubricant, thereby making it possible to greatly increase the durability of the cross roller assembly as a whole.

Still further, for a material forming the retainer, synthetic resin such as polytetrafluoroethylene (PTFE), etc., can be used as a concrete example.

With the use of such synthetic resin, the cross roller assembly can be fabricated by insert molding, i.e., injecting a resin material into cavities in a molding frame for the retainer with the rollers being pre-inserted in the molding frame.

Here, it is to be noted that a lubricant such as grease can be presented between respective portions of the first and second rollers and the respective portions of the retainer which are in mutual contact with each other. Due to the presence of such a lubricant as well as the use of a flexible and slippery material for the retainer, it is possible to prevent an increase in the mutual frictional resistance between the first and second rollers and the retainer, thus ensuring smooth movement of the cross roller assembly as a whole.

According to another aspect of the present invention, there is provided a cross roller guiding apparatus comprising: an elongated track shaft having an upper surface and opposite side surfaces; and a moving object mounted on the track shaft for movement therealong, the moving object having a horizontal portion disposed in opposition to the upper surface of the track shaft, a pair of hanging portions provided on the opposite sides of the horizontal portion in opposition to the opposite side surfaces of the track shaft, each of the hanging portions having a circulation path formed therein. Each of the circulation paths comprises a rolling track of V-shaped cross section with an included angle of 90 degrees formed on each of the opposite sides of the track shaft and on an inner surface of each of the hanging portions opposing to the track shaft one side, a return passage of a substantially rectangular cross section provided in each of the hanging portions in parallel with the rolling track, and a pair of turning passages connecting between the opposite ends of the rolling track and the return passage. A cross roller assembly is incorporated in the circulation path of each hanging portion. The cross roller assembly includes a train of first rollers and a train of second rollers, and a retainer for holding the first and second rollers in respective alignment with their axes of rotation alternatively arranged at right angles with respect to each other, the retainer comprising a pair of end holders for supporting the opposite ends of each roller, each of the end holders having an outer surface which is a flat guide surface.

In particular, with the cross roller guiding apparatus as defined above, there is a tendency that when the cross roller assembly passes the turning passages of each circulation path, the rollers are drawn to the inner peripheral sides of the turning passages. Despite such a tendency, the interval or distance between the opposed end holders in each pair is constantly held at a predetermined value and hence not varied during the movement of the roller assembly through the turning passages, whereby the postures of the rollers are maintained constant by virtue of the end holders. As a consequence, the axes of rotation of the rollers will not be caused to sway or deflect from the direction in which the rollers are travelling, thus preventing the rollers from being skewed.

The cross roller assembly as described above is applicable to a roller guide bearing having a pair of linear track shafts disposed in parallel with each other, or to a swivel or pivot bearing having a pair of track rings disposed in opposition to each other.

The roller guide bearing may be constructed such that the cross roller assembly as described above is serially incorporated in a pair of V-shaped track grooves respectively formed on the opposed surfaces of the respective track shafts at right angles with respect to each other so as to support the respective track shafts for movement relative to each other.

The swivel bearing is constructed such that the cross roller assembly as described above is incorporated in a pair of V-shaped track grooves respectively formed on the opposed surfaces of the respective track rings for supporting the respective track rings for rotation thereof relative to each other.

The above and other objects, features and advantages of the present invention will become more readily apparent from the following detailed description of presently preferred embodiments of the invention taken in conjunction with the accompanying drawings.

DESCRIPTION OF THE PREFERRED EMBODIMENTS

Now, a few presently preferred embodiments of the invention will be described in detail while referring to the accompanying drawings.

Figure 1A:
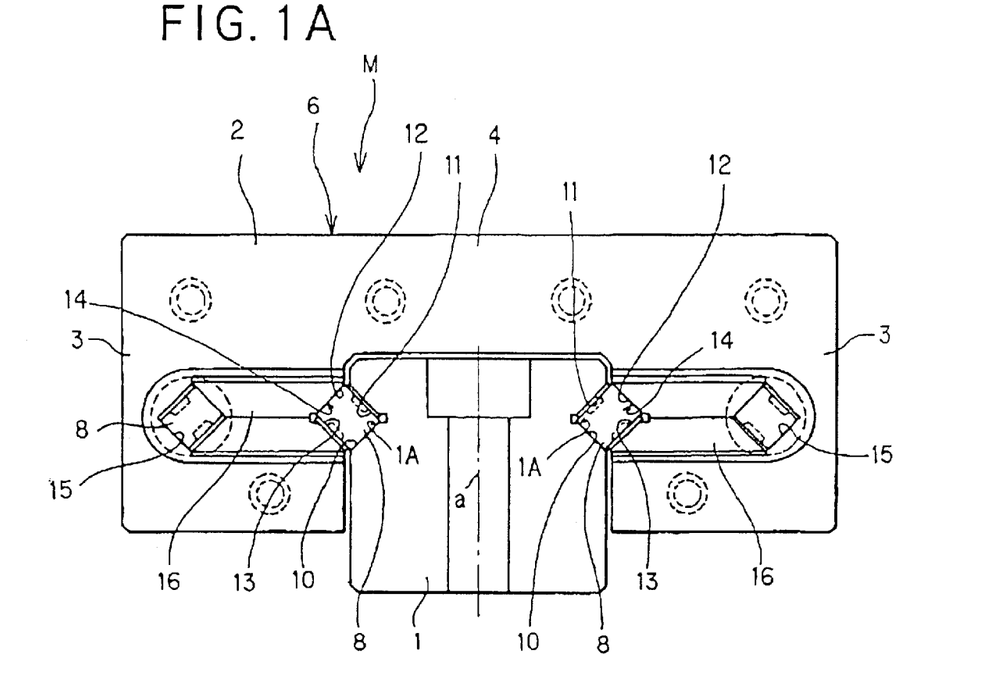
FIG. 1A is a front elevational view showing a roller contacting structure of a cross roller guiding apparatus in accordance with a first embodiment of the present invention with a side cover being detached.
Figure 1B:
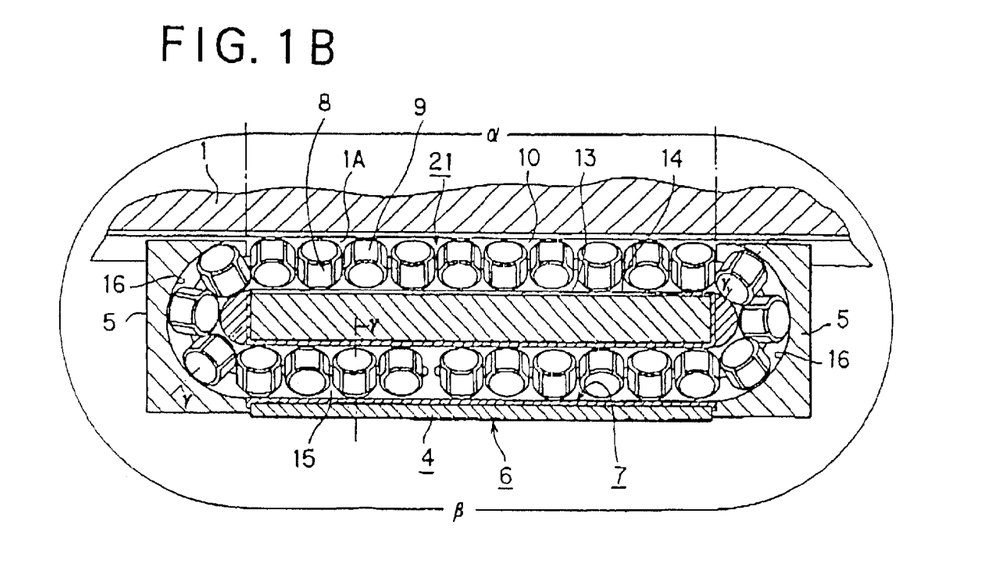
FIG. 1B is as cross sectional view of a roller circulation path of the apparatus of FIG. 1A.
Figure 2:
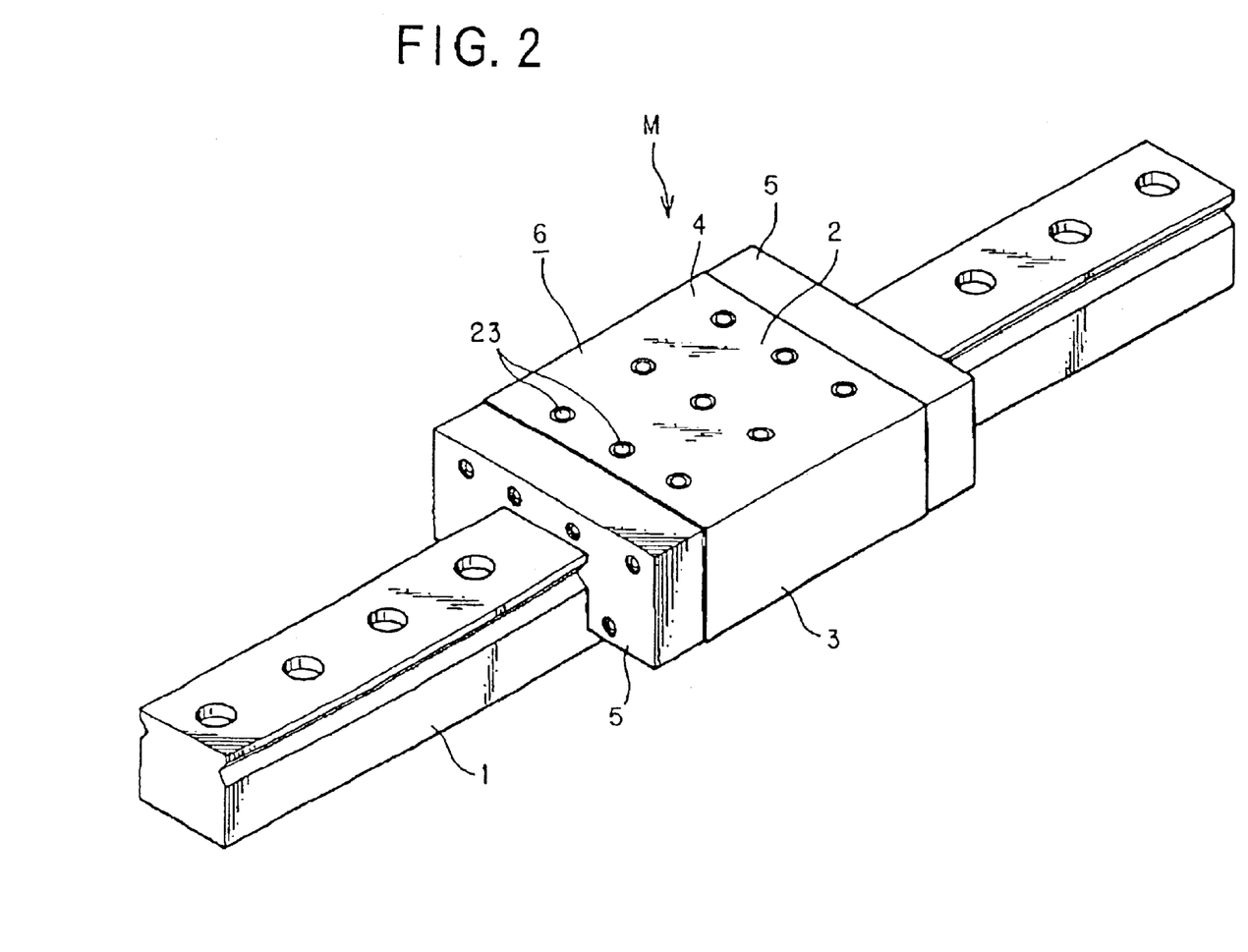
FIG. 2 is a perspective view showing an external appearance of the apparatus of FIGS. 1A and 1B.

FIGS. 1A and 1B and FIG. 2 illustrate a cross roller guiding apparatus using a cross roller connector or assembly constructed in accordance with a first embodiment of the present invention.

The cross roller guiding apparatus, generally designated at a reference character M, includes an elongated track shaft 1, and a moving object 6 of a generally inverted U-shaped cross section having a horizontal portion 2 disposed in opposition to an upper surface of the track shaft 1 and a pair of hanging portions 3, 3 provided on horizontally opposite sides of the horizontal portion 2 in an opposed relation to the horizontally opposite side surfaces of the track shaft 1, each of the hanging portions 3, 3 having a circulation path 7 formed therethrough in a direction in which the moving object 6 is movable along the track shaft 1. The apparatus M further includes a cross roller assembly 21 incorporated serially in each of the circulation paths 7, 7 respectively formed in the hanging portions 3, 3 for supporting the moving object 6 on the track shaft 1 for movement therealong.

As shown in FIGS. 1A, 1B and FIG. 2, the track shaft 1 has a rectangular cross section and is formed in upper portions of its opposite side surfaces with a pair of track grooves each of a V-shaped cross section having its included angle of 90 degrees in a horizontally symmetric relation with respect to a vertical central line or axis of the track shaft 1. Also, the moving object 6 comprises a body member 4, and a pair of side covers 5, 5 fixedly attached to longitudinal ends, respectively, of the body member 4 by fastening means such as bolts.

As shown in FIG. 1B, each circulation path 7 comprises a track groove 14 of a V-shaped cross section with its included angle of 90 degrees formed on an inner surface of each hanging portion 3 of the moving object 6 in opposition to an associated track groove 1A of the track shaft 1, a return passage 15 of a substantially rectangular cross section formed in each hanging portion 3 so as to extend in parallel with the associated track groove 14, and a pair of U-shaped turning passages 16 each connecting between the adjacent ends of the associated track groove 14 and return passage 15 for turning or changing the direction of travel in which the rollers travel. The track grooves 1A, 14 of each circulation path 7 formed on the track shaft 1 and the moving object 6 have a pair of roller rolling surfaces 10, 11 and another pair of roller rolling surfaces 12, 13, respectively, with an included angle of 90 degrees formed between the adjacent roller rolling surfaces 10, 11 and 12, 13 in each pair.

As shown in FIG. 3, each cross roller assembly 21 comprises a first train of rollers 8 and a second train of rollers 9 alternatively disposed within an associated circulation path 7 in a serial manner, and a retainer 21 for holding the first and second rollers 8, 9 in a serially aligned manner with their axes of rotation alternatively arranged at right angles with respect to each other. The first and second rollers 8, 9 are rotatably disposed between the opposed roller rolling surfaces 10, 12, 11, 13, respectively, of the paired track grooves 1A, 14.

Figure 3A:
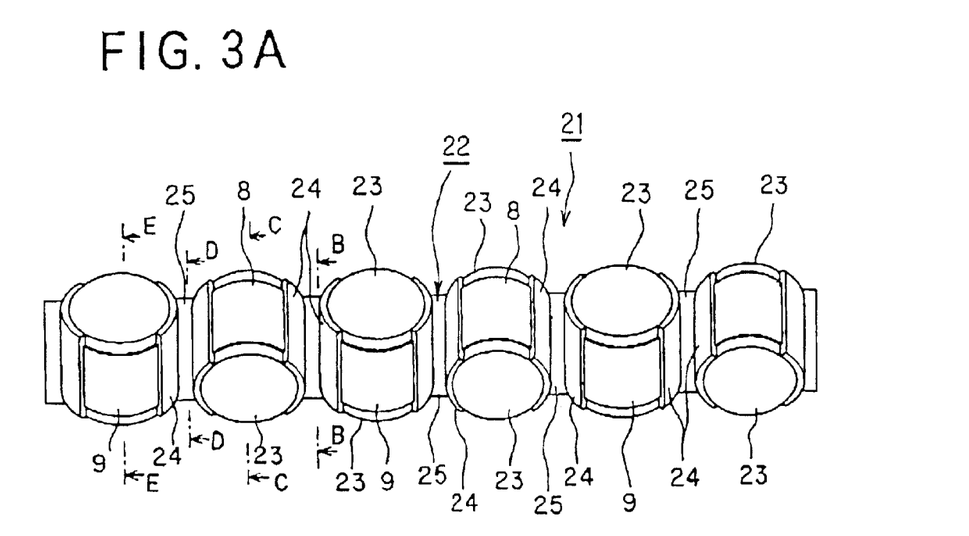
FIG. 3A is a partial front elevational view of a cross roller assembly incorporated in the roller circulation path of the apparatus of FIGS. 1A and 1B.
Figure 3B:
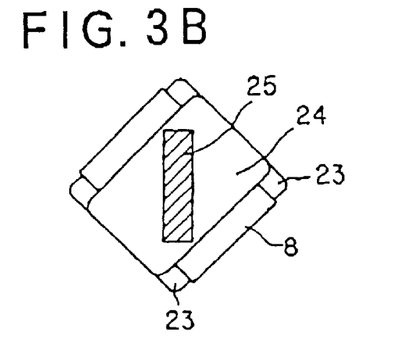
FIG. 3B is a cross sectional view taken along line B—B of FIG. 3A.
Figure 3C:
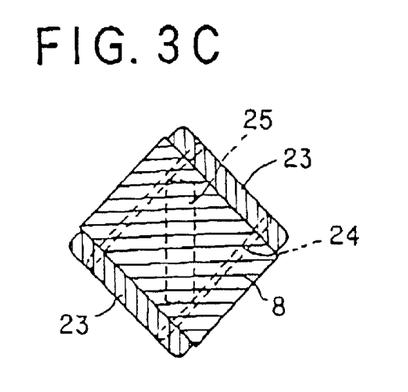
FIG. 3C is a cross sectional view taken along line C—C of FIG. 3A.
Figure 3D:
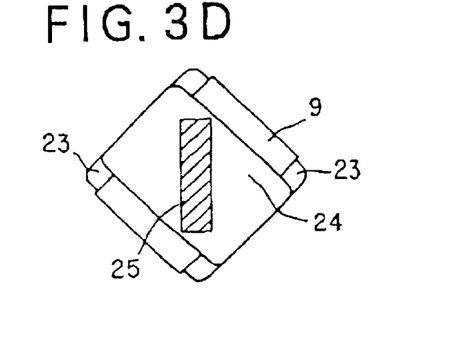
FIG. 3D is a cross sectional view taken along line D—D of FIG. 3A.
Figure 3E:
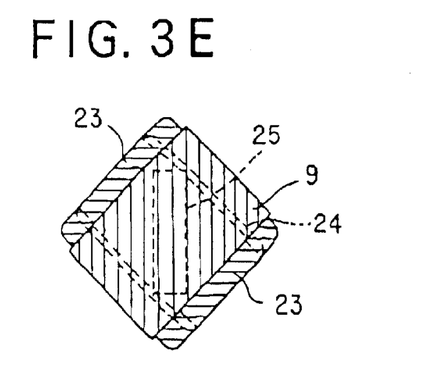
FIG. 3E is a cross sectional view taken along line E—E of FIG. 3A.

As clearly illustrated in FIGS. 3A through 3C, the retainer 22 comprises a plurality of pairs of end holders 23 for supporting the opposite ends of each of the first and second rollers 8, 9, a plurality of pairs of side holders 24 disposed on the opposite sides of each roller to connect opposite sides of one of each pair of end holders 23 with those of the other thereof for holding the opposite sides of each roller, and a plurality of connector members 25 for connecting roller-non-holding side surfaces of adjacent side holders 24 on which the rollers are not supported. Each of the end holders 23 has an outer surface formed into a flat guide surface.

Each end holder 23 takes the shape of a thin circular plate having a diameter slightly smaller than that of the end faces of the first and second rollers 8, 9. An inner surface of each end holder 23, with which an end of an associated roller is in contact, is also a flat surface. In this regard, it is to be noted that the shape and size of each end holder 23 may be optional or arbitrary as long as the size or diameter thereof is not greater than that of the roller end face and as long as paired end holders 23 can support or clamp a roller from the opposite ends thereof In consideration of easiness and convenience in fabrication, however, it is preferable that the size or area of the end holder 23 be in the range of from about 80% to about 95% of the area of each end face of the rollers 8, 9.

Each of the side holders 24 is of a partially circular or arc-shaped cross section so as to hold a part of the cylindrical side surface of an associated one of the first and second rollers 8, 9, and has a surface, which is in opposition to the side cylindrical surface of each roller, formed into a concave curved surface having a curvature substantially equal to that of the cylindrical side surface of each roller, so that the cylindrical side surface of each roller is covered by two opposed side holders 24 with limited spaces or gaps formed therebetween.

The side holders 24 function to avoid interference between adjacent rollers and cooperate with the respective end holders 23 to stabilize the axis of rotation of each roller. Moreover, each of the spaces or gaps between the adjacent ends of each pair of two opposed side holders 24 holding the front and rear side cylindrical surface portions of each roller is designed to be narrower than the diameter of each roller, thus preventing each roller from falling off therefrom.

Each of the connector members 25 takes a flat plate-like configuration and is connected at its opposite (front and rear) side edges with the outer side arc-shaped surfaces of adjacent side holders 24. As clearly shown in FIGS. 3B and 3D, the direction of the connector members 25 is arranged to bisect the angle of intersection of 90 degrees formed between the central axes of the first and second rollers 8, 9. That is, the connector members 25 are connected with the outer surfaces of the side holders 24 at an angle of 45 degrees.

The cross roller assembly 21 can be fabricated by means of so-called insert molding, i.e., injecting a molten synthetic resin material into cavities formed in a mold frame (not shown) with the first and second rollers 8, 9 placed or inserted therein. The use of such insert molding can omit the step of assembling the first and second rollers 8, 9 into the retainer 22, thus simplifying and facilitating the fabrication of the cross roller assembly 21.

In addition, slight or limited clearances are required between the first and second rollers 8, 9 and the side holders 24 for smooth rolling of the rollers. Such clearances can be formed, for example, by immersing the insert-molded retainer 22 in oil or the like to make it expand.

Now, description will be made of the operation of the above-mentioned linear guiding apparatus.

The first and second rollers 8, 9 of the cross roller assembly 21 rolling run between the roller rolling surfaces 10, 12, 11, 13 of the track 14 grooves 1A, 14 under load in accordance with movement of the moving object 6 relative to the track shaft 1, pass the return passage 15 via one of the U-shaped turning passages 16, and return to the starting end of the track groove 14 from the other turning passage 16.

In the loaded region of each circulating path 7, the first rollers 8 are guided by the roller rolling surfaces for the second rollers 9 through the end holders 23 and the side holders 24, so that the correct or proper posture of each first roller 8 is thereby maintained. Similarly, the second rollers 9 are guided by the roller rolling surfaces for the first rollers 8 through the end holders 23 and the side holders 24, so that the correct or proper posture of each second roller 9 is thereby maintained.

Moreover, in no-load or unloaded regions constituted by the return passages 15 and the turning passages 16, the first and second rollers 8, 9 are guided by the side walls or surfaces of the return and turning passages 15, 16. In particular, during travelling through the turning passages 16, the first and second rollers 8, 9 tend to be drawn to the inner peripheral side of each turning passage 16, but in this case, since. the opposite end faces of the first and second rollers 8, 9 are in contact with the inner surfaces of the opposed end holders 23, the postures of the first and second rollers 8, 9 are regulated or restricted such that the axis of rotation X of each roller is arranged in a direction perpendicular to the direction of movement thereof.

Accordingly, in the whole regions of each circulating path 7, the first and second rollers 8, 9 are regulated or restricted so as to prevent the axes of rotation λ thereof from being swayed or deflected from the direction of movement thereof by means of the opposed end holders 23. Especially, in this embodiment, the end holders 23 are in sliding contact with the substantially entire end faces of the first and second rollers 8, 9, so the areas of contact between the outer surfaces of the end holders 23 and the side walls or surfaces of each circulating path 7 are large, thus providing an increased effect of preventing swaying or deflection of the rotation axes of the rollers.

It is preferred that the side walls of the end holders 23 and the turning passages 16 and the return passages 15 be formed of a low-friction material such as slippery resin, e.g., polytetrafluoroethylene (PTFE) and the like. A lubricating material such as grease may be filled into spaces between the first and second rollers 8, 9 and the retainer 21, as desired. The lubricating material will circulate while being held in portions such as so-called grease pockets formed between the side holders 24 of the retainer 21 and the first and second rollers 8, 9 which are mutually adjacent to each other with the side holders 24 interposed therebetween.

As can be seen from FIGS. 4A through 4D), it is also preferred that provision be optionally made for an engaging means comprising an engagement concave or recess 26 and an engagement convex 27 which are disposed between the end faces of the first and second rollers 8, 9 and the end holders 23 and engageable with each other for sliding and rotating movements relative to each other. In the illustrated examples, the engagement concave 26 is provided in the center of each end face of each roller 8 or 9, and the engagement convex 27 is provided on the inner surface of each end holder 23. On the contrary, such a relation can be reversed, that is, an engagement convex way be provided on each end face of each roller 8 or 9, and an engagement concave may be provided on the inner surface of each end holder 23.

With such arrangements, the postures of the first and second rollers 8, 9 are made more stable, preventing skewing and falling off thereof.

Figures 4A, 4B, 4C, 4D, 4E:
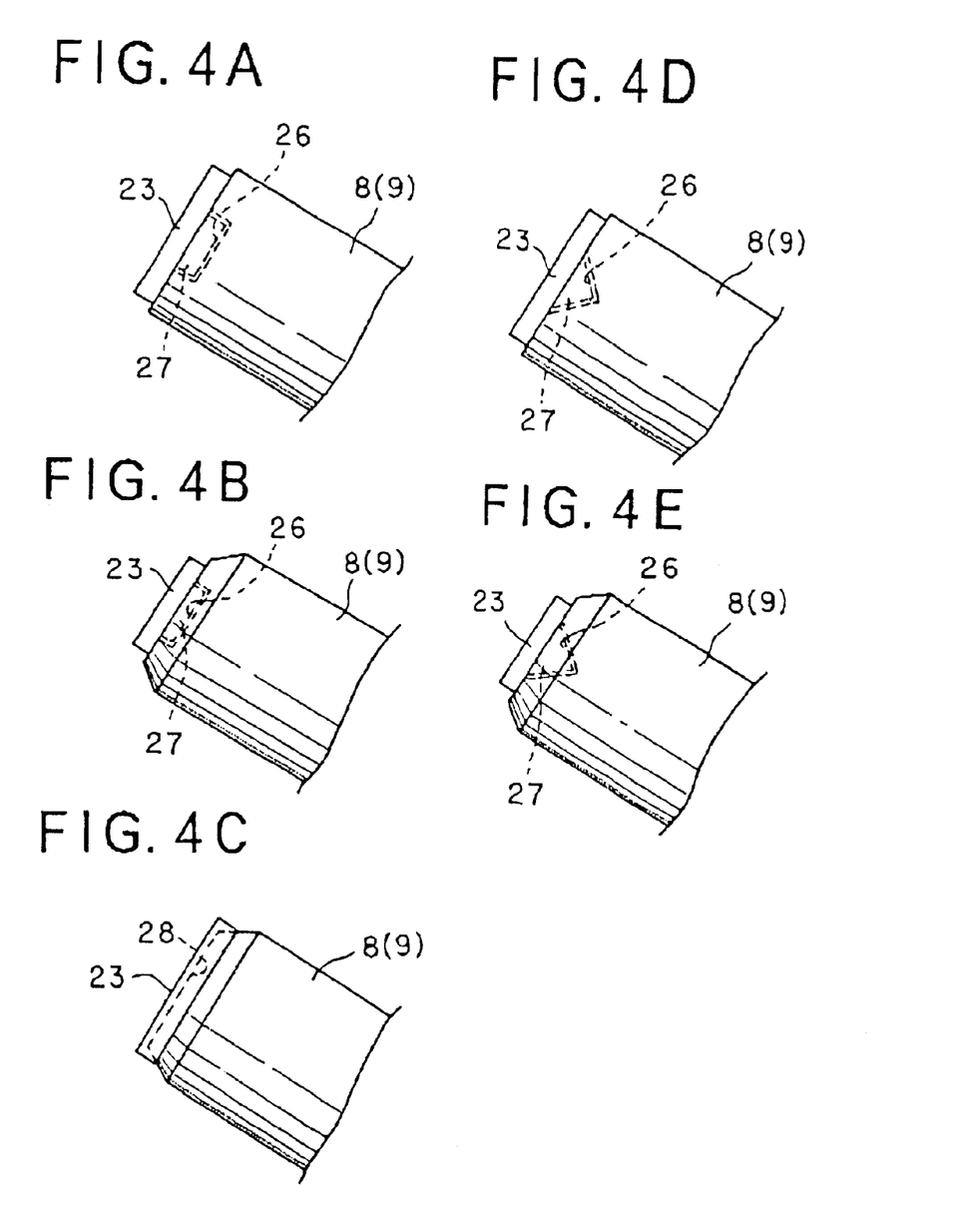
FIGS. 4A through 4E are views showing a variety of forms of connections between a roller and an end holder.

The configuration of the engagement convex 26 can be of any shape such as a flat cylindrical shape as shown in FIG. 4A, a triangular pyramid as shown in FIG. 4D, etc.

Moreover, FIGS. 4B and 4E illustrate examples of a roller in the form of a chamfered roller comprising a cylindrical roller having a corner of each end face thereof chamfered. The roller 8 or 9 and each end holder 23 of FIG. 4B are provided with a cylindrical-shaped engagement concave 26 and a cylindrical-shaped engagement convex 27, respectively, as in the case of the roller shown in FIG. 4A, whereas the roller 8 or 9 and each end holder 23 of FIG. 4E are provided with a triangular-pyramid- shaped engagement concave 26 and a triangular-pyramid-shaped engagement convex 27, respectively, as in the case of the roller shown in FIG. 4D.

In addition, when using chamfered cylindrical rollers, each end holder 23 may be provided on its inner surface with a recess 28 for loosely receiving or engaging a chamfered end of a cylindrical roller 8 or 9 so as to permit rotation of the roller relative to the end holder, as shown in FIG. 4E.

Figure 5A:
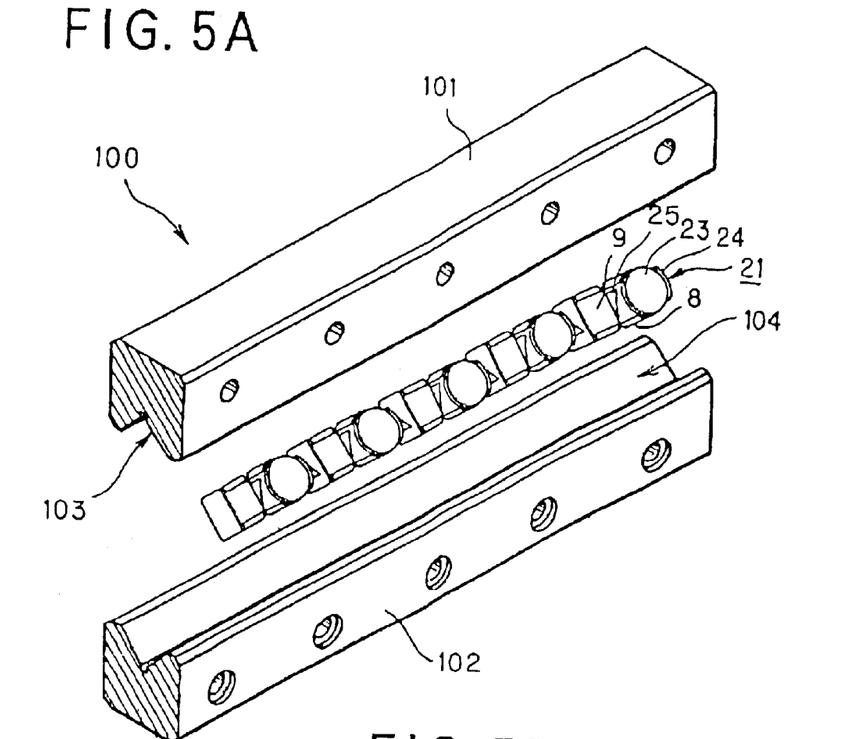
FIG. 5A is a schematic exploded perspective view of a cross roller guiding apparatus in accordance with a second embodiment of the present invention.
Figure 5B:
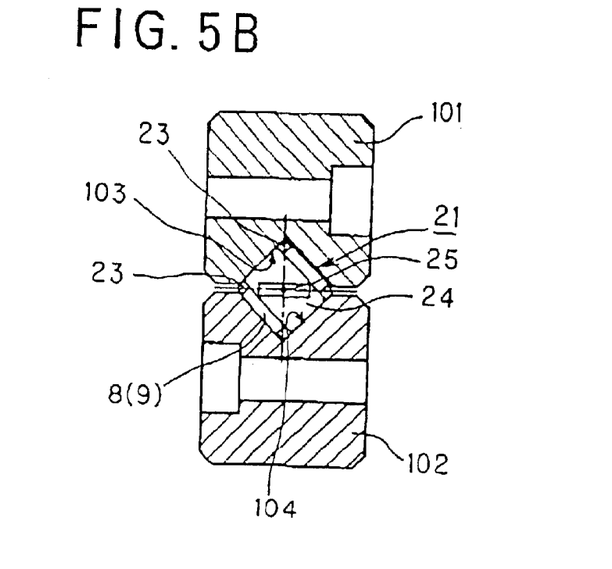
FIG. 5B is a vertical sectional view of the apparatus of FIG. 5A.
Figure 6A:
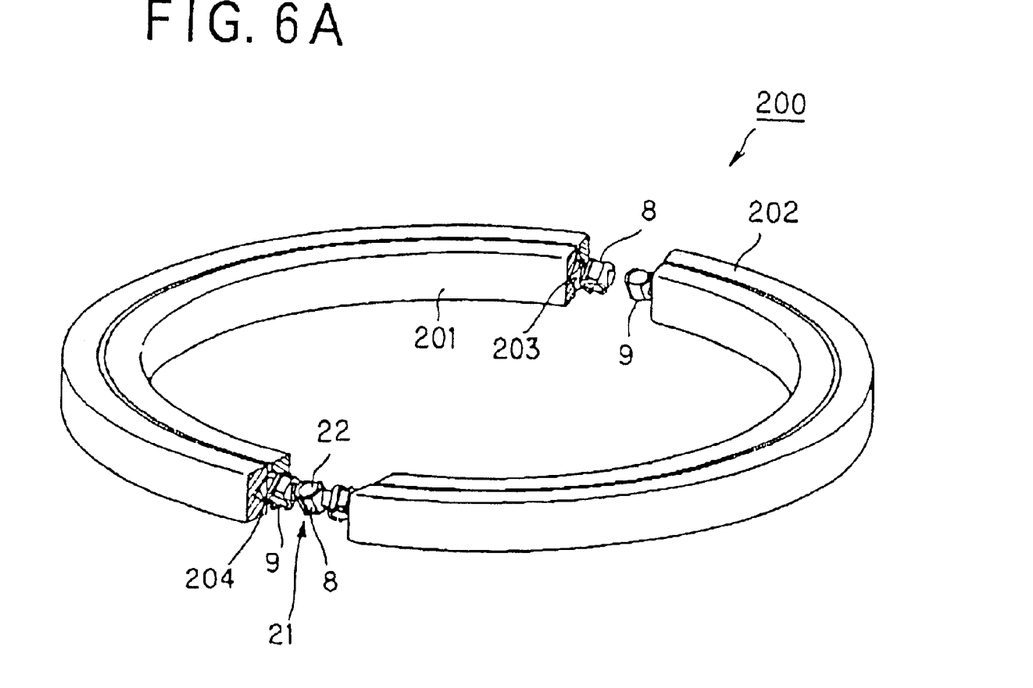
FIG. 6A is a partially broken-away perspective view of a cross roller guiding apparatus in accordance with a third embodiment of the present invention.
Figure 6B:
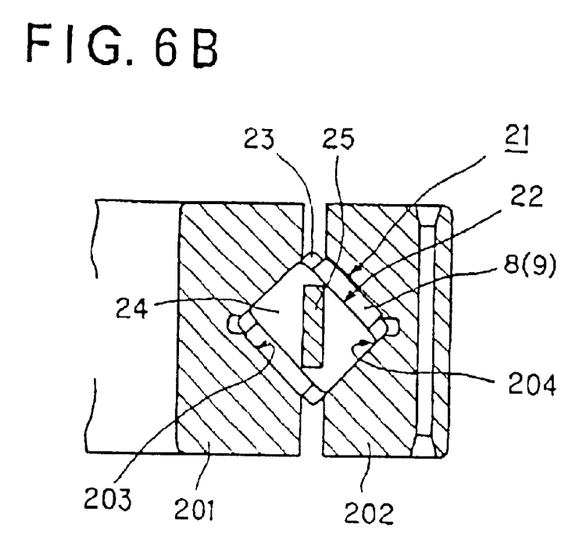
FIG. 6B is a partial cross sectional view of the apparatus of FIG. 6A.

The cross roller assembly 21 can be applied to a roller guide bearing as shown in FIGS. 5A and 5B, or a swivel or pivot bearing as shown in FIGS. 6A and 6B.

As depicted in FIGS. 5A and 5B, the roller guide bearing is constructed such that it includes a pair of linear track shafts 101, 102 disposed in parallel with each other and having track grooves 103, 104 each of a V-shaped cross section with an included angle of 90 degrees formed on the mutually opposing surfaces of the track shafts 101, 102, and a cross roller assembly 21 as described above which is serially incorporated in a space defined between the opposed V-shaped track grooves 103, 104 so as to support the track shafts 101, 102 for movement relative to each other.

As clearly shown in FIGS. 6A and 6B, the swivel bearing is constructed such that it has a cross roller assembly 21 incorporated between a pair of V-shaped track grooves 203, 204 which are formed on the opposing surfaces of track rings 201, 202, respectively, so as to support the track rings 203, 204 for rotation relative to each other.

The construction and operation of the cross roller assembly 21 of these bearings are substantially the same as those of the first mentioned embodiment, and hence a detailed description thereof will be unnecessary and omitted.

While the invention has been described in terms of a few preferred embodiments, those skilled in the art will recognize that the invention can be practiced with modification within the spirit and scope of the appended claims.

What is claimed is:

1. A roller assembly comprising:
   a train of first rollers;
   a train of second rollers, said first and second rollers rotationally moving on tracks;
   a retainer for holding the first and second rollers with their axes of rotation alternatively arranged at right angles with respect to each other, said retainer comprising a plurality of pairs of end holders for supporting and covering opposite end faces of the first and second rollers, said end holders being in sliding contact with the tracks to align the first and second rollers with respect to the tracks.

2. The roller assembly as set forth in claim 1, wherein each of said retainers further comprises:
   a side holder for connecting roller-aligning direction opposite ends of each end holder with each other to thereby hold a side surface of each roller; and
   a connector member for connecting roller-non-holding side surfaces of each side holder with each other.

3. The roller assembly as set forth in claim 1, further comprising engaging means disposed between the opposite faces of each of said first and second rollers and the end holders for supporting each roller through said end holders while permitting rotation of said rollers relative to said end holders.

4. The roller assembly as set forth in claim 1, wherein a recess is formed in an inner surface of each end holder for loosely engaging an end of an associated roller so as to permit rotation of each roller relative to the associated end holder.

5. A cross roller guiding apparatus comprising:
   an elongated track shaft having an upper surface and opposite side surfaces;
   a moving object mounted on said track shaft for movement therealong, said moving object having a horizontal portion disposed in opposition to the upper surface of said track shaft, a pair of hanging portions provided on the opposite sides of said horizontal portion in opposition to the opposite side surfaces of said track shaft, each of said hanging portions having a circulation path formed therein;
   each of said circulation paths comprising a rolling track of V-shaped cross section with an included angle of 90 degrees formed on each of the opposite sides of said track shaft and on an inner surface of each of said hanging portions opposing to said track shaft one side, a return passage of a substantially rectangular cross section provided in each of said hanging portions in parallel with said rolling track, and a pair of turning passages connecting between the opposite ends of said rolling track and said return passage, a cross roller assembly incorporated in said circulation path of each hanging portion, said cross roller assembly including a train of first rollers and a train of second rollers, and a retainer for holding said first and second rollers in respective alignment with their axes of rotation alternatively arranged at right angles with respect to each other, said retainer comprising a pair of end holders for supporting the opposite ends of each roller, each of said end holders having an outer surface which is a flat guide surface.

6. A roller assembly comprising:

rollers arranged between moving members for facilitating relative movement of the moving members, the rollers being grouped in sets each held at a different angular position so as to rotationally move on a different track; and a retainer for holding the rollers in a train, including end holders provided in pairs each axially supporting a roller and covering its end face, wherein the end holders are in sliding contact with the tracks to align the rollers with respect to the tracks.

7. A roller assembly according to claim 6, wherein the retainer also comprises side holders for radially supporting the rollers.

8. A roller assembly according to claim 7, wherein the side holders are provided in pairs each sandwiching a roller in the direction of the train.

9. A roller assembly according to claim 6, wherein the train is closed in shape.

10. A roller assembly according to claim 6, wherein the train is open in shape.

11. A roller assembly according to claim 6, wherein the end holders are flat.

12. A roller assembly according to claim 6, the end holder covers nearly the entire end surface of the roller.

13. A roller assembly according to claim 12, wherein the end holder covers about 80% to about 90% of an end surface of the roller.

14. A roller assembly according to claim 6, wherein there are two sets of rollers and two tracks.

15. A roller assembly according to claim 14, wherein the rollers in one set take a 90 degree angular position with respect to the rollers in the other set.

16. A roller assembly according to claim 6, wherein the retainer is made of a low-friction material.

17. A roller assembly according to claim 16, wherein the material is polytetrafluoroethlene (PTFE).

18. A roller assembly according to claim 6, wherein the end holders and the end surfaces of the rollers rotatably engage with each other.

19. A method of making a roller assembly defined in claim 6, comprising the steps of:

providing a molding die for molding the retainer;

injecting a molten material into the molding die;

placing rollers into the molten material in the molding die; and leaving the material in the molding die until it becomes solid.

* * * * *

UNITED STATES PATENT AND TRADEMARK OFFICE
CERTIFICATE OF CORRECTION

PATENT NO.     : 6,419,069 B1
DATED          : July 16, 2002
INVENTOR(S)    : Hiroshi Teramachi It is certified that error appears in the above-identified patent and that said Letters Patent is hereby corrected as shown below:

<u>Title page,</u>
Item [56], U.S. PATENT DOCUMENTS, insert the following:

| | | | |
|---|---|---|---|
| -- 3,778,121 | 12/1973 | Levesque | 384 |
| 4,215,904 | 8/1980 | Teramachi et al. | 384 |
| 4,598,957 | 7/1986 | Shibayama | 384 |
| 4,692,036 | 9/1987 | Kawaguchi | 384 |
| 4,755,065 | 7/1988 | Walter et al. | 384 |
| 5,363,741 | 11/1994 | Takada et al. | 384 --. |

Signed and Sealed this

Eleventh Day of February, 2003

JAMES E. ROGAN
*Director of the United States Patent and Trademark Office*